April 12, 1955   G. W. WHITE   2,706,224
TIMER SWITCH

Filed July 7, 1953   3 Sheets-Sheet 1

INVENTOR.
GEORGE W. WHITE
BY
Lindsey and Prutzman
ATTORNEYS

April 12, 1955  G. W. WHITE  2,706,224
TIMER SWITCH

Filed July 7, 1953  3 Sheets-Sheet 2

INVENTOR.
GEORGE W. WHITE
BY
Lindsey and Prutzman
ATTORNEYS

April 12, 1955        G. W. WHITE        2,706,224
TIMER SWITCH

Filed July 7, 1953        3 Sheets-Sheet 3

INVENTOR.
GEORGE W. WHITE
BY
Lindsey and Prutzman
ATTORNEYS

United States Patent Office 2,706,224
Patented Apr. 12, 1955

2,706,224

TIMER SWITCH

George W. White, West Hartford, Conn., assignor to Veeder-Root Incorporated, Hartford, Conn., a corporation of Connecticut Application July 7, 1953, Serial No. 366,457

12 Claims. (Cl. 200—39)

The present invention relates to timer switches and more particularly to a clock-driven, manually settable switch for carrying out a plurality of switching operations spaced by a selected manually settable time interval and finishing at a selected time relative to clock time.

A timer switch of the type with which the present invention is concerned is particularly suitable for use in a timer of the type described in the copending application of Harvey N. Bliss, #285,360, filed May 1, 1952. Such a timer is particularly suitable for controlling a plurality of switching operations which are spaced in time in accordance with a selected first setting, and which are also arranged so that the last switching operation occurs at a particular clock time in accordance with a selected second setting. One exemplary use for such a timer, as described in the copending application #285,360 is to control the switching operations necessary to energize and de-energize the cooking circuit of an electric stove, to allow selection of a desired time interval between a later time when the stove will be automatically turned on, and a still later time when the stove will be automatically turned off, thus establishing a desired cooking duration, and to allow the selection of a desired clock time at which the turning off of the stove is to occur and the cooking be finished.

A general object of the invention, therefore is to provide a timer switch for performing a sequence of switching operations spaced by a selected time interval and arranged to take place so that the final switching operation occurs at a selected future time.

Another object of the invention is to provide a timer switch of the character described which is adapted to be driven by a clock mechanism, thereby insuring accurate and dependable timing of its switching operations.

A further object is to provide a timer switch which will indicate in a clear and readable, understandable manner the exact status of the switching operations at any given instant, and which is so arranged that it will be clearly evident to the operator whether or not the timer switch has been properly conditioned to accomplish the result desired by the operator.

Another object of the invention is to provide a timer switch having the above-described functions which is of simple and efficient design and construction so that it may be economically fabricated and assembled for production at a competitive price.

Another object is to provide such a timer switch which will be simple and easy to set, which will be fool-proof in operation, and which will function effectively and reliably over long periods of time without requiring repair or adjustment.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
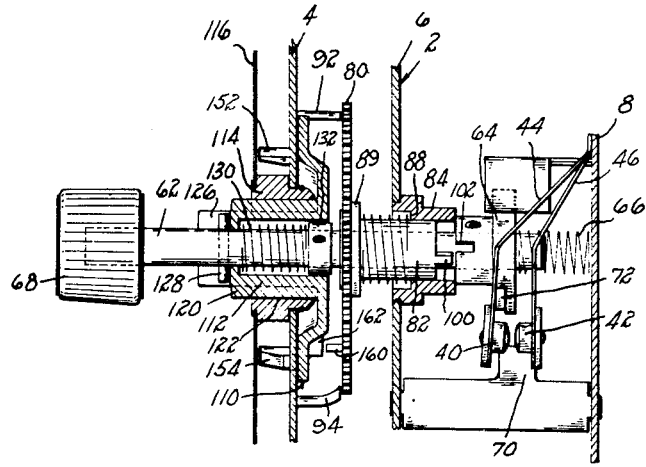
Fig. 1 is an enlarged sectional view of a timer switch constructed in accordance with the present invention and showing the control elements for the switch in the OFF position.

Referring to the drawings, a timer switch constructed in accordance with the present invention will be described with relation to a timer of the type shown in the above cited co-pending application #285,360, and its operation illustrated in connection with controlling the cooking circuit of an electric stove. The timer switch is mounted in a frame 2 consisting of a front plate 4, middle plate 6, and back plate 8, which are secured in parallel spaced-apart relation by posts 10. On frame 2 is supported a clock mechanism 12 having an output gear 14 which is connected through conventional gearing to hour and minute hands 16, and is also connected to one input gear of a differential gear mechanism supported between the front and middle plates and indicated generally at 18.

Figure 6:
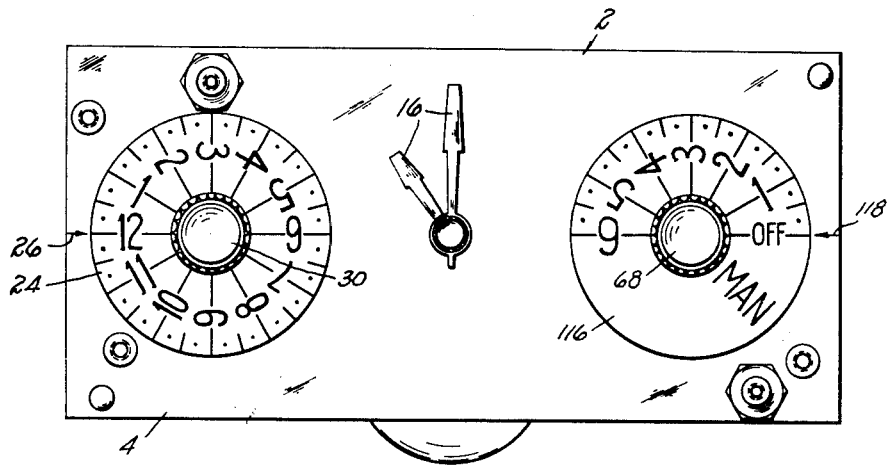
Fig. 6 is a front view of the complete timer shown in Fig. 4.

To the other input gear of the differential gear mechanism is connected a manually rotatable gear 20 having a hub 22 supported in front plate 4. On hub 22 of gear 20 is fastened a dial 24 numbered about its periphery from one to twelve, as shown in Fig. 6. Dial 24 may be read in relation to a reference mark 26 on plate 4 to indicate the selected time at which the sequence of switching operations controlling the cooking operation of the stove is to be finished, and the stove switched off. Fixed within hub 22 is a shaft 28 bearing a knob 30 by which hub 22, gear 20, and dial 24 may be rotated. Shaft 28 and gear 20 are urged by spring 32 forwardly in frame 2 so that gear 20 normally rests against front plate 4. In this position gear 20 meshes with a detent 34 struck up from the rear face of front plate 4, which prevents rotation of gear 20 until shaft 28 is displaced rearwardly by knob 30.

The arrangement above described forms no part of the present invention, but is merely such as to provide for rotation of the output gear of the differential gear train in accordance with the algebraic sum of finish time, as evidenced by the rotative position of gear 20 and dial 24, and clock time. Details of operation of a general arrangement of this type which may be satisfactorily employed with the timer switch of the present invention are shown and described more fully in the above cited co-pending application #285,360.

The timer switch includes opposed front and rear contacts 40, 42, supported on respective front and rear flexible current-conducting contact arms 44, 46, attached to electrically separated terminals 48, 50 on back plate 8. Contact arms 44, 46 are so arranged as to keep the contacts 40, 42 normally closed, providing a current-conducting path between terminal 48 and terminal 50.

Figure 2:
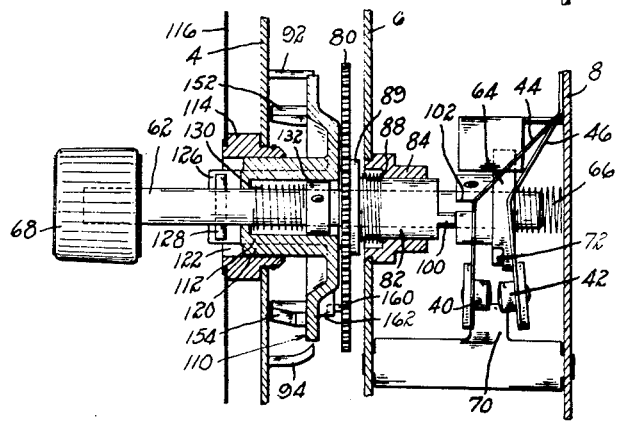
Fig. 2 is another sectional view of the timer switch, similar to Fig. 1, but illustrating the position of the switch control elements after the selected settings for the switching operations have been made.
Figure 3:
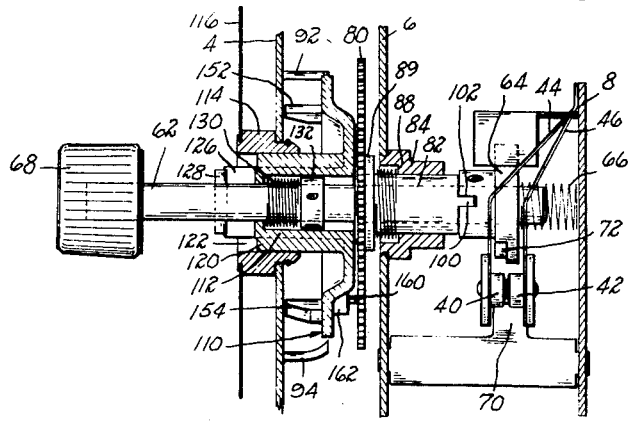
Fig. 3 is another view of the switch similar to Figs. 1 and 2 but illustrating the position of the switch control elements after the initial switching operation has been performed.
Figure 4:
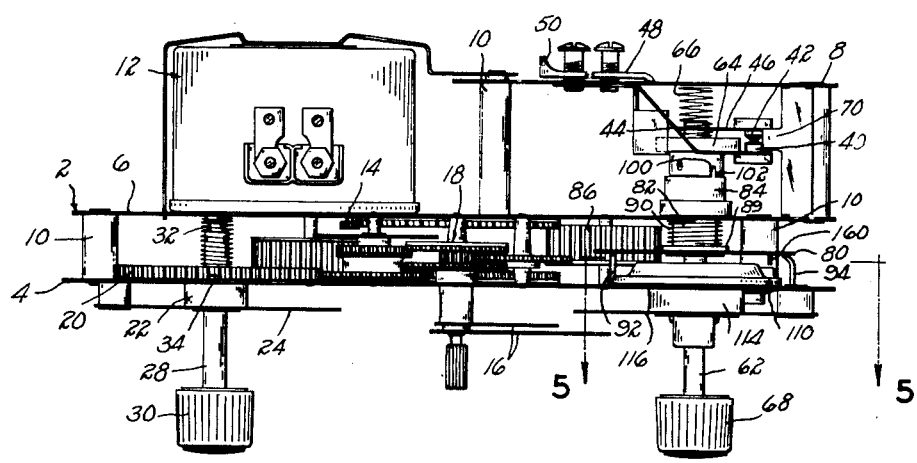
Fig. 4 is a top view of a timer switch constructed in accordance with the present invention and embodied in a timer of the type described in co-pending application #285,360, above cited.

The means for operating the contact arms 44, 46 comprises a shaft 62 which is mounted in frame 2 for rotation and for axially slidable movement therein between three positions of longitudinal stability, shown consecutively in Figs. 1, 2, and 3. Shaft 62 is disposed generally transversely of contact arms 44, 46, and has fixed thereto a switch control cam 64, which is disposed between the contact arms. Shaft 62 is urged axially forwardly of frame 2 by a spring 66 disposed between cam 64 and rear plate 8. The shaft 62 may be manually moved rearwardly against the bias of spring 66 by means of a knob 68 disposed on the forward end of shaft 62.

In the second or rearmost longitudinal position of shaft 62, as illustrated in Fig. 2 of the drawings, switch cam 64 pushes the rear contact arm 46 rearwardly to open the switch. When shaft 62 is moved forwardly to its third position of longitudinal stability, as shown in Fig. 3, cam 64 allows rear contact arm 46 to come forward and close the switch. When the shaft is moved further forward to its original or first position of longitudinal stability, as shown in Fig. 1, cam 64 carries front contact arm 44 forwardly to open the switch. A stop 70 supported between middle and rear plates 6, 8 projects between the ends of contact arms 44, 46, and provides sufficient clearance for contacts 40, 42 to close as shown in Fig. 3, but restrains either contact when the other is moved away, thus insuring the desired separating action of the contacts in response to longitudinal movement of shaft 62.

Switch control cam 64 also has an indented portion 72 which is provided for the purpose of permitting the contacts to close when the shaft and cam are longitudinally positioned as shown in Fig. 1, and properly rotated to bring indented portion 72 between the contact arms.

Supported on shaft 62 for slidable and rotatable movement with respect thereto is a driving gear 80 having a hub 82 journaled in a bushing 84 supported in middle plate 6. The driving gear 80 is the member of the timer switch which is operatively connected to clock 12, this connection being provided by an intermediate gear 86 which drives driving gear 80 from the output gear of differential 18. Thus, it may be seen that driving gear 80 is continuously rotated by clock 12 and is always positioned rotatively in accordance with the relation of clock time to the finish time set on dial 24. Spaced between a shoulder 88 internal of bushing 84 and a shoulder 89 on the hub 82 of driving gear 80 is a spring 90 which urges driving gear 80 forwardly to a limiting position at which it bears against diametrically disposed support pins 92, 94 struck up from front plate 4. Projecting from the rear face of hub 82 is a radially disposed key 100 which is adapted to fit in a radial slot 102 cut in switch control cam 64 when the cam 64 and driving gear 80 are properly rotatibly aligned. Hub 82 is of such a length that key 100 is retracted completely within bushing 84 when driving gear 80 rests against support pins 92, 94.

Also slidably supported on shaft 62 is a driven element 110 having a hub 112 which is slidably supported in a bushing 114 journaled in front plate 4. On bushing 114 is carried a dial 116 having one-half its periphery numbered from one to six. Dial 116 may be read in relation to a reference mark 118 on front plate 4, to indicate the selected duration for the cooking operation of the stove, i. e. the time interval between closing of the switch to turn the stove on and opening of the switch to turn the stove off.

The hub 112 of driven element 110 is provided with a key 120 which coacts with a keyway or slot 122 in the bushing 114, so that driven element 110 and dial 116 are axially slidable relative to each other, but rotate together. The front end of hub 112 is provided with a diametrical slot 126 in which slides a pin 128 supported in shaft 62, so that shaft 62 and driven element 110 always rotate together, but shaft 62 is allowed limited axial movement within hub 112 of driven element 110. The driven element is urged forwardly of shaft 62 by a spring 130 acting between the inside of hub 112 and a shoulder or collar 132 on shaft 62, so as to bottom pin 128 in diametrical slot 126.

Projecting from the front face of driven element 110 is a pair of diamterically spaced cams 152, 154. The cams are positioned at differential radii on driven element 110 and are adapted to seat in respective arcuate slots 156, 158 in front plate 4 when aligned therewith, thereby permitting driven element 110 to be held by spring 130 against front plate 4. This longitudinal position of driven element 110 and shaft 62 is shown in Fig. 1. In this position driving gear 80 is also held in its limiting forward position against support pins 92, 94 by the action of spring 90. Intermediate gear 86 is axially thick enough to remain engaged with the teeth of driving gear 80 throughout the limit of axial movement of the driving gear. Thus, driving gear 80 is always rotatively connected to the clock mechanism 12, regardless of its axial position.

Figure 5:
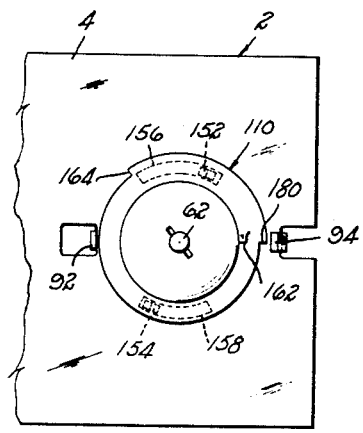
Fig. 5 is a view of the timer switch in Fig. 4 taken on the line 5—5 thereof.

Struck up from the front side of driving gear 80 is a pick-up pin 160, having a perpendicular counterclockwise face and a sloping clockwise face. On the rear face of driven element 110 at the same radius from the center of shaft 62 as pick-up pin 160 is another pin 162, which has a perpendicular clockwise face and a sloping counterclockwise face as shown in Fig. 5 and is adapted to be rotatably engaged by pick-up pin 160 for rotation of driven element 110 therewith during a portion of the switching cycle.

To limit the counterclockwise rotative position of shaft 62 when it is in the longitudinal position shown in Fig. 1, driven element 110 is enlarged in radius over a portion of its periphery to provide a shoulder 164, one side of which bears against the top edge of the support pin 92. In this extreme counterclockwise position of shaft 62, indented portion 72 of cam 64 is disposed between contact arms 44, 46, thus permitting contacts 40, 42 to close, and dial 116 is so oriented as to display the indication MAN opposite the reference mark 118, signifying that the contacts of the timer switch are closed and the stove cooking circuit is capable of manual operation. The arcuate slots 156, 158 in front plate 4 are of sufficient length to accommodate cams 152, 154 during this counterclockwise rotation of driven element 110.

As the shaft and switch cam are turned clockwise from the manual position, indented portion 72 is removed from between contact arms 44, 46, and the front contact 40 is cammed forwardly to the position shown in Fig. 1, thus opening the switch. At this rotative position of shaft 62, dial 116 is so oriented as to display the indication OFF opposite reference mark 118, signifying that the contacts of the timer switch are open.

In operation, the timer switch is intended to perform automatically a plurality of switching operations spaced by a selected settable time interval, and finishing at a selected settable time relative to clock time. This operation will now be described in connection with control of an electric stove, to perform the switching operations necessary to provide a cooking operation having a selected settable duration, and finishing at a selected settable clock time. To set up a desired cooking time duration, i. e. the desired interval between switching operations which turn the stove on and then later turn it off, shaft 62 is first displaced rearwardly of frame 2 by means of knob 68, from the position shown in Fig. 1 to the position shown in Fig. 2. This compresses spring 66 and pushes the driven element away from front plate 4 sufficiently to raise cams 152, 154 out of slots 156, 158, displacing driving gear 80 rearwardly off its support pins 92, 94, and compressing spring 90 at hub 82 of driving gear 80.

The cams 152, 154 in driven element 110 are of such a height that, in lifting the cams out of their arcuate slots 156, 158, the driven element 110 must be displaced a sufficient distance rearward to contact driving element 80 and displace it rearwardly far enough to extend the whole of radial key 100 out of bushing 84. The length of radial key 100 is such that its displacement of the switch cam 64 and rear contact 42 rearwardly is sufficient to open the switch. Radial key 100 thus displaces switch cam 64 and the rear contact arm rearwardly away from stop 70, thereby keeping the switch contacts open, even though the front contact arm comes to rest against the stop.

If the finish time set on dial 24 and the clock time happen to be the same at this moment, so that when driven element 110 is in the position corresponding to "off," pick-up pin 160 on driving gear 80 is just about to rotatively engage pin 162 on driven element 110 as shaft 62 is moved rearwardly, driven element 110 is cammed clockwise by the sloping face of its pin 162 acting on the sloping face of the pick-up pin 160 on driving gear 80. This insures that driven element 110 is freely rotatable clockwise by knob 68 without interference between pick-up pin 160 and pin 162 while the cooking time is being set on dial 116.

After being thus displaced axially rearward, shaft 62 is rotated clockwise from its "off" position until cooking time dial 116 displays the desired cooking duration in hours opposite mark 118. This rotates cams 152, 154 out of alignment with arcuate slots 156, 158, and the cams then ride on the back side of front plate 4 and maintain driven element 110 spaced therefrom. The driven element 110 in turn maintains driving gear 80 in its rearmost position against the compression of spring 90, while radial key 100 acts against the front face of switch cam 64 and holds the switch cam 64 rearward against the force of spring 66, thereby retaining rear contact arm 46 flexed rearwardly so as to keep the switch contacts open.

The shaft 62 is rotated clockwise an amount corresponding to desired cooking time, the necessary angular displacement being determined by the rate of rotation of driving gear 80 by clock mechanism 12. In the embodiment shown in the drawing each thirty degrees of rotation of shaft 62 and dial 116 corresponds to one hour of cooking time. In this longitudinally displaced position of shaft 62, its clockwise rotation is limited to a maximum of 180 degrees by another shoulder 180 on the periphery of driven element 110, which bears against the bottom side of support pin 92.

As driven element 110 is rotated clockwise with shaft 62 in accordance with the desired cooking time, the pin 162 is also displaced angularly. It is the function of the driving gear 80, as rotated by clock mechanism 12, to engage pin 162 with pickup pin 160 and rotate driven element 110 counterclockwise, back to its "off" position.

To set the selected time at which the sequence of switching operations is to be finished, i. e. at which the stove is to be finally turned off to complete the cooking operation, dial 24 is rotated to place opposite mark 26 the numeral designating selected finish time. As previously explained, setting of dial acts through gear 20, differential 18 and intermediate gear 86 to position driving gear 80 in accordance with the relation of clock time to selected finish time.

The rotative position of driving gear 80 determines the angular orientation of radial key 100. The rotation of driven element 110 clockwise in accordance with the desired cooking time also rotates radial slot 102 in switch cam 64 relative to radial key 100. Thus it may be seen that the relative angular orientation of radial key 100 and slot 102 is set by clockwise rotation of shaft 62 in accordance with desired cooking time, and rotation of driving gear 80 in accordance with the relation of clock time and finish time. This relative angular orientation of the slot 102 and key 100 determines the angle through which driving gear 80 must be moved by clock mechanism 12 to realign radial key 100 for seating in slot 102. When this happens, shaft 62 and switch cam 64 are moved forwardly by spring 66 to the position shown in Fig. 3, thus closing the contacts of the timer switch and energizing the stove to commence the cooking operation.

The arrangement above described is such as to position radial key 100 relative to slot 102 so that, before key 100 is seated in the slot 102 and cooking begins, the proper amount of time will have elapsed to complete the required cooking time by the required finish time. In other words, the slot 102 must be positioned counterclockwise of the key 100 by the time duration between finish time and clock time, less cooking time.

When key 100 seats in slot 102, pick-up pin 160 engages pin 162 and continued counterclockwise rotation of driving gear 80 then carries driven element 110 and switch cam 64 with it. The forward movement of switch cam 64 and shaft 62 by spring 66 lifts the pin 128 away from the bottom of the diametrical slot 122 in hub 112, and compresses spring 130 inside hub 112, thus continuing the bias of driven element 110 against the back of front plate 4.

The subsequent counterclockwise rotation of the driving gear 80 by clock mechanism 12 thus carries with it the switch cam 64, shaft 62, driven element 110, and cooking time dial 116, all of which rotate together. As driving gear 80 carries driven element 110 and dial 116 back toward the position at which the OFF designation on dial 116 is aligned with reference mark 118, cams 152, 154 arrive at the clockwise edges of their respective arcuate slots 156, 158. When cams 152, 154 become fully aligned with their respective slots 156, 158, they are urged forward into the slots by the action of spring 130, and driven element 110 moves forward until it again rests against front plate 4, as shown in Fig. 1. The forward movement of driven element 110 removes support from the driving gear 80, and it in turn is moved forward on shaft 62, by spring 90 on its hub 82, to a position limited by its contact with support pins 92, 94. This forward movement of driving gear 80 and its hub 82 on shaft 62 is of sufficient length to retract radial key 100 fully within bushing 84, thus permitting switch cam 64 to be moved forwardly by spring 66 to a position of rest where it bears against the back of bushing 84.

The forward movement of driving gear 80 is limited by support pins 92, 94 to a distance slightly less than the forward movement of driven element 110 when its cams 152, 154 drop into arcuate slots 156, 158. In this way, the pin 162 on the driven element 110 is disengaged from pick-up pin 160 on driving gear 80, so that the subsequent continued movement of driving gear 80 by clock mechanism 12 has no effect on driven element 110 or the shaft 62.

The forward movement of switch cam 64, when the driven element cams 152, 154 drop into slots 156, 158 permits relaxation of rear contact arm 46, which carries rear switch contact 42 forwardly against the stop 70. At the same time switch cam 64 carries the front contact arm 44 forward to the position shown in Fig. 1, thus opening the switch and finishing the cooking operation.

When the device is assembled, the parts are arranged so that, when the setting on the finish time dial 24 and the clock time are the same and the cook time dial 116 is set at its OFF position, the driving gear pick-up pin 160 is exactly opposite the driven element pin 162 and the switch cam slot 102 is exactly opposite radial key 100. Since, in operation of the device, the driving gear 80 is driven in a counterclockwise direction by the running of the clock motor, but is turned clockwise by the setting of a later finish time, this initial relationship of parts during assembly of the device insures that the rotated position of the driving gear 80 will always be determined by the algebraic sum of the clock time and the finish time.

The operator may select any desired cooking period, or interval between successive switching operations, this interval being indicated on dial 116 by the numeral opposite reference mark 118. As the length of cooking time is increased, driven element is rotated to move pin 162 clockwise; when the cooking period is decreased, pin 162 is moved counterclockwise. The time after present clock time when the driving gear 80 picks up the driven element 110 will be equal to the difference between the desired finish time and present clock time, minus the desired cooking period, and thus will be decreased by the clockwise movement of the driven element 110 when cooking time is lengthened, and also will be decreased by the counterclockwise movement of the driving gear 80 when finish time is made earlier. It is therefore apparent that the relative angular positions of the driving gear pick-up pin 160 and driven element pin 162 will be determined by the difference between finish time and clock time, less the cooking time.

When the driven element 110 is attempted to be advanced clockwise through an angle corresponding to a greater amount of cooking time than is available from the difference between finish time and clock time, perpendicular face of pin 162 on the driven element 110 hits the perpendicular face of pick-up pin 160 on the driving gear 80 and prevents further clockwise rotation of driven element 110. In this way, it is impossible for the operator to select more cooking time than is available from the difference between finish time and clock time. Conversely, when cooking time is set first, it is impossible to select a finish time later than clock time by an amount greater than the selected amount of cooking time, because the pin 162 on the driven element 110 engages the pick-up pin 160 on the driving gear 80 and carries the driven element 110 with it clockwise, thus increasing cooking time above the desired amount. Also, it is impossible to set an earlier finish time than the sum of clock time and cooking time because the rotation of the driving gear 80 counterclockwise when making finish time earlier carries the driven element 110 with it and reduces cooking time to less than the desired amount.

It will thus be seen that there has been provided in accordance with the present invention a timer switch which is automatic and fool-proof in operation, which can be set simply and easily, and which will accurately and dependably perform a sequence of timed switching operations, selectably settable to occur with a desired interval, and finish at a selectably settable time relative to clock time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:
1. In a timer switch, a plurality of switch contacts, a control member for actuating said contacts to perform switching operations, a driving element engageable with said control member controlling a first movement of said control member to perform a first operation of said switch, a driven element movable relative to said driving element for controlling a second movement of said control member to perform a second operation of said switch, and pick-up means on said driving element for movably engaging said driven element at a selected rotated position of said driving element relative to said driven element.

2. In a timer switch, a plurality of switch contacts, a rotatable and longitudinally slidable control member for actuating said contacts to perform switching operations, a driving element engageable with said control member controlling a first longitudinal movement of said control member at a selected relative rotated position thereof to perform a first operation of said switch, a driven element rotatable relative to said driving element controlling a second longitudinal movement of said control member at a selected rotated position of said driven element to perform a second operation of said switch, and pick-up means on said driving element for rotatably engaging said driven element at a selected relative rotated position thereof.

3. In a timer switch, a plurality of switch contacts, a rotatable and longitudinally slidable control member for actuating said contacts to perform switching operations, a driving element engageable with said control member controlling a first longitudinal movement of said control member at a selected rotated position thereof relative to said driving element to perform a first operation of said switch, a driven element controlling a second longitudinal movement of said control member at a selected rotated position of said driven element to perform a second operation of said switch, shaft means securing said driven element in fixed rotative relation with said control member, and pick-up means on said driving element for rotatably engaging said driven element at said selected relative rotative position of said control member and driving element.

4. In a timer switch, a plurality of switch contacts, a rotatable and longitudinally slidable control member for actuating said contacts to perform switching operations, manual means rotatably positioning said control member in accordance with a selected first setting, a clock driven rotatable driving element controlling a first longitudinal movement of said control member at a selected rotated position thereof relative to said driving element to perform a first operation of said switch, a driven element controlling a second longitudinal movement of said control member at a selected rotated position of said driven means to perform a second operation of said switch, shaft means securing said driven element in fixed rotative relation with said control member, and pick-up means on said driving element for rotatably engaging said driven element at said selected relative rotative position of said control member and driving element whereby said second switching operation is delayed from said first switching operation in accordance with said selected first setting.

5. In a timer switch, a plurality of switch contacts, a rotatable and longitudinally slidable control member actuating said contacts to perform switching operations, manual means rotatably positioning said control member in accordance with a selected first setting, a driving element adapted to be rotatably positioned in accordance with the relation of clock time to a selected second setting, said driving element engaging said control member and controlling a first longitudinal movement of said control member at a selected rotated position thereof relative to said driving element to perform a first operation of said switch at a time determined by the relation of said first and second settings, a driven element controlling a second longitudinal movement of said control member at a selected rotated position of said driven element to perform a second operation of said switch, shaft means securing said driven element in fixed rotative relation with said control member, and pick-up means on said driving element for rotatably engaging said driven element at said selected relative rotative position of said control member and driving element whereby said second switching operation occurs at a time determined by the relation of clock time and said second setting.

6. In a timer switch, a rotatable shaft having three positions of longitudinal stability, switch contacts, movable support means for at least one of said contacts, a switch control member on said shaft adapted to engage said support means to open said switch contacts in the first and second longitudinal positions of said shaft and close said switch contacts in the third longitudinal position of said shaft, manual means for setting said shaft at said second longitudinal position and rotating said shaft away from a reference position in accordance with a selected first setting, a driving element positioned in accordance with the relation of clock time to a selected second setting, notch means on said control member for rotatively engaging said driving element in a selected relative rotative position therewith to move said shaft to its third longitudinal position and close said switch at a time determined by the relation of said first and second settings, a driven element fixed for rotation with said shaft, pick-up means on said driving element for rotatively engaging said driven element in said second and third longitudinal positions of said shaft and in said selected relative rotated position to return said shaft to said reference position, and cam means on said driven element for moving said shaft to its first longitudinal position responsive to its rotation to said reference position to open said switch at a time determined by the relation of clock time and said second setting.

7. In a timer switch, a rotatable shaft having three positions of longitudinal stability, switch contacts, movable support means for at least one of said contacts, a switch control member on said shaft adapted to engage said support means to open said switch contacts in the first and second longitudinal positions of said shaft and close said switch contacts in the third longitudinal position of said shaft, said switch control member having a manual rotative position permitting closing of said switch contacts upon rotation thereto in the first longitudinal position of said shaft, manual means for setting said shaft at said second longitudinal position and rotating said shaft away from a reference position in accordance with a selected first setting, a driving element positioned in accordance with the relation of clock time to a selected second setting, notch means on said control member for rotatively engaging said driving element in a selected relative rotative position therewith to move said shaft to its third longitudinal position and close said switch at a time determined by the relation of said first and second settings, a driven element fixed for rotation with said shaft, pick-up means on said driving element for rotatively engaging said driven element in said second and third longitudinal positions of said shaft and in said selected relative rotated position to return said shaft to said reference position, and cam means on said driven element for moving said shaft to its first longitudinal position responsive to its rotation to said reference position to open said switch at a time determined by the relation of clock time and said second setting.

8. In a timer switch a support frame, a shaft journaled in said frame and having three positions of longitudinal stability, a pair of switch contacts, movable support means for said contacts, a switch control member fixed to said shaft and adapted to engage said movable support means to open said switch contacts in the first and second longitudinal positions of said shaft and close said switch contacts in the third longitudinal position of said shaft, biasing means urging said shaft toward said first longitudinal position, manual means for moving said shaft to said second longitudinal position and rotating said shaft away from a reference rotated position in accordance with a desired first setting, a clock driven driving element rotatively positioned in accordance with the relation of clock time to a desired second setting, notch means on said switch control member adapted to cooperate with said driving element in a selected relative rotated position therewith to release said shaft to its third longitudinal position, whereby said switch is closed at a time determined by the relation of said first and second settings, a driven element fixed for rotation with said shaft and adapted to be rotatably engaged by said driving element in said second and third longitudinal positions of said shaft and in said selected relative rotated position, whereby as time passes said shaft is returned by said driving element to its reference rotated position, and cam means on said driven element cooperating with said support frame to release said shaft to its first longitudinal position responsive to its rotation to said reference rotated position, whereby said switch is opened at a time determined by the relation of clock time and said second setting.

9. In a timer switch, a pair of opposed contacts, a supporting frame, movable contact arms supporting said contacts from said frame, a rotatable and longitudinally movable shaft, a switch control member fixed to said shaft and disposed between said movable contact arms to open said switch in a first and second longitudinal position of said shaft and close said switch in a third intermediate longitudinal position, means for biasing said shaft toward its first longitudinal position, a driven element slidable in said frame between a first and a second position and fixed for rotation with said shaft, a driving element slidable in said frame between a first and a second position and adapted to be continuously rotatively positioned on said shaft in accordance with the relation of clock time to a selected second setting, manual means for moving said shaft to said second longitudinal position to open said switch while displacing said driven and driving elements to their respective second positions and for rotating said shaft away from a reference rotative position in accordance with a selected first setting, cam means on said driven element cooperating with said frame to sustain said driven element and driving element in their second positions while said driven element is rotated out of said reference position, a projection on said driving element, a notch in said control cam adapted to receive said projection when rotatively aligned therewith, whereby said shaft and cam are released to said third longitudinal position to close said switch at a time determined by the relation of said first and second settings, pick-up means on said driving element to rotatively engage said driven element in its second position when said notch and projection are rotatively aligned, whereby subsequent rotation of said driving element returns said driven element to said reference rotative position, slots in said frame adapted to receive said cam means to release said shaft to its first longitudinal position when said driven element is returned to said reference rotative position whereby said driven and driving elements are returned to their first respective positions and said switch is opened at a time determined by the relation of clock time and said second setting.

10. In a timer switch, a support frame, a rotatable and longitudinally movable shaft, a front contact and a rear contact, front and rear movable contact arms supporting said contacts, a switch control member fixed to the shaft between said contact arms for actuating said switch responsive to longitudinal displacement of said shaft, means biasing said shaft to its undisplaced position, manual means for displacing the shaft longitudinally to displace said rear contact arm and open the switch, a driven element longitudinally slidable on said shaft and fixed for rotation therewith, cam means on the driven element for retaining said shaft in rearwardly displaced position responsive to the rotative position of said driven element from a reference rotative position in accordance with a selected first setting, a driving element adapted to be rotatively positioned in accordance with the relation of clock time to a selected second setting, a key on the driving element cooperating with a notch in the switch control cam at a selected relative rotated position thereof to permit partial release of said shaft displacement and return of said rear contact arm to close said switch at a time determined by the relation of said first and second settings, pick-up means on the driving element for rotatively engaging said driven element in said relative rotated position to return said driven element to its initial position, and slots in said support frame cooperating with said driven element cam means to release said shaft to its undisplaced position when said driven element is returned to its reference rotative position, whereby said switch control member displaces said front contact arm to open said switch at a time determined by the relation of clock time and said second setting.

11. In a timer, a switch comprising a shaft mounted for rotational and axial movement, a plurality of switch contacts mounted for actuation in response to axial movement of the shaft, means biasing the shaft in one axial direction, manually operable means for moving the shaft in the opposite axial direction to a first switch actuating position and for rotating the shaft away from an initial rotated position, a first stop rotatably driven by the timer for holding the shaft in said first switch actuating position and provided with means for releasing the shaft for movement in said one axial direction at a predetermined rotated position of the stop, a second stop rotatably movable with the shaft for holding the shaft in a second switch actuating position and provided with means for releasing the shaft for further movement in said one axial direction upon rotation of the second stop with the shaft to said initial rotated position, and means forming a driving engagement between the first stop and the second stop when the shaft is in said second switch actuating position.

12. In a timer, a switch comprising a shaft mounted for rotational and axial movement, a plurality of switch contacts, a cap fixed at one end of the shaft for actuating the switch contacts upon axial movement of the shaft, a control member non-rotatably mounted on the shaft but axially movable with respect thereto, a gear driven by the timer freely mounted on the shaft intermediate the cap and the control member, manually operable means to turn the shaft away from an initial rotated position and to move the shaft control member and gear in an axial direction to an axial position with the control member gear and cap in end abutting relationship, means biasing the shaft in the opposite axial direction, stop means retaining the control member in said axial position except when the control member is in initial rotated position, means on the gear and cap permitting limited movement of the cap and shaft in said opposite axial direction at a predetermined relatively rotated position of the gear and shaft, and pick-up means operable when the gear and shaft are in said predetermined relatively rotated position forming a driving connection between the gear and control member for returning the control member to said initial rotated position.

References Cited in the file of this patent

UNITED STATES PATENTS

| | | |
|---|---|---|
| 2,217,226 | Lux | Oct. 8, 1940 |
| 2,301,942 | Gallagher | Nov. 17, 1942 |
| 2,310,527 | Hutt | Feb. 9, 1943 |
| 2,312,492 | Schlenker | Mar. 2, 1943 |
| 2,545,617 | Kaefer et al. | Mar. 20, 1951 |
| 2,605,833 | Bliss | Aug. 5, 1952 |